US012600480B2

(12) United States Patent
Rheaume

(10) Patent No.: US 12,600,480 B2
(45) Date of Patent: Apr. 14, 2026

(54) VEHICLE PASSENGER SEAT ASSEMBLY

(71) Applicant: MHI RJ Aviation ULC, Boisbriand (CA)

(72) Inventor: Michel Rheaume, Prevost (CA)

(73) Assignee: MHI RJ Aviation ULC, Boisbriand (CA)

( * ) Notice: Subject to any disclaimer, the term of this patent is extended or adjusted under 35 U.S.C. 154(b) by 159 days.

(21) Appl. No.: 18/560,265

(22) PCT Filed: Jan. 20, 2022

(86) PCT No.: PCT/CA2022/050080
§ 371 (c)(1),
(2) Date: Nov. 10, 2023

(87) PCT Pub. No.: WO2022/236398
PCT Pub. Date: Nov. 17, 2022

(65) Prior Publication Data
US 2024/0239494 A1 Jul. 18, 2024

Related U.S. Application Data

(60) Provisional application No. 63/187,247, filed on May 11, 2021.

(51) Int. Cl.
B64D 11/06 (2006.01)

(52) U.S. Cl.
CPC ...... B64D 11/0647 (2014.12); B64D 11/0631 (2014.12)

(58) Field of Classification Search
CPC .......................... B64D 11/0647; B64D 11/0631
See application file for complete search history.

(56) References Cited

U.S. PATENT DOCUMENTS

| 3,762,766 A | 10/1973 | Barecki et al. |
| 4,498,703 A | 2/1985 | Schmidhuber et al. |
| 6,588,839 B1 | 7/2003 | Salzer |
| 8,544,796 B2 | 10/2013 | Pozzi et al. |

(Continued)

FOREIGN PATENT DOCUMENTS

| CN | 104245508 A | * 12/2014 | ......... B64D 11/0647 |
| CN | 212556247 U | 2/2021 | |

(Continued)

OTHER PUBLICATIONS

Extended European Search Report issued in corresponding European Application No. 22806143.8; dated Feb. 25, 2025 (9 pages).

(Continued)

*Primary Examiner* — Anthony D Barfield
(74) *Attorney, Agent, or Firm* — Osha Bergman Watanabe & Burton LLP

(57) ABSTRACT

A vehicle passenger seat assembly for a passenger cabin of a vehicle includes: a pair of side frames; passenger seats disposed between the pair of side frames. Each of the passenger seats includes: a back portion configured to support a back of a passenger; and a bottom portion configured to support a hip of the passenger. The vehicle passenger seat assembly further includes: a first horizontal beam that connects the pair of side frames and is disposed at the same vertical height, from a floor of the passenger cabin, as a lower end of the back portion.

15 Claims, 12 Drawing Sheets

(56)     References Cited

U.S. PATENT DOCUMENTS

| | | |
|---|---|---|
| 2009/0058165 A1 | 3/2009 | Rombouts |
| 2011/0148173 A1 | 6/2011 | Westerink et al. |
| 2015/0217868 A1 | 8/2015 | Gonnsen et al. |
| 2018/0229847 A1 | 8/2018 | Smallhorn |
| 2019/0047710 A1 | 2/2019 | Bell et al. |

FOREIGN PATENT DOCUMENTS

| | | | |
|---|---|---|---|
| FR | 2588171 | A1 | 4/1987 |
| GB | 2437164 | A | 10/2007 |
| JP | 2019-069668 | A | 5/2019 |
| WO | 2013-144622 | A1 | 10/2013 |

OTHER PUBLICATIONS

International Search Report and Written Opinion in corresponding International Application No. PCT/CA2022/050080, dated Mar. 23, 2022 (12 pages).

\* cited by examiner

810

920

910

900

VEHICLE PASSENGER SEAT ASSEMBLY

TECHNICAL FIELD

The present disclosure relates to a passenger seat assembly in a cabin of a vehicle used to transport passengers as well as their luggage.

BACKGROUND

Shape, size, and weight are important design considerations for passenger vehicles. This is particularly true for aircrafts, which rely on aerodynamic lift to stay airborne and safely transport passengers. In general, an aircraft is designed to have a substantially cylindrical body extending in a direction of movement (i.e., the direction of airflow outside the aircraft) and wings attached to the cylindrical body and extending laterally to the direction of airflow. The cross-sectional area of the cylindrical body should be as small as practically possible to minimize drag and fuel consumption. This limits the available space inside the aircraft.

On the other hand, an aircraft should be designed to comfortably seat as many passengers as possible, along with their luggage.

SUMMARY

One or more embodiments of the present invention are directed to a vehicle passenger seat assembly for a passenger cabin of a vehicle, including: a pair of side frames; passenger seats disposed between the pair of side frames. Each of the passenger seats includes: a back portion configured to support a back of a passenger; and a bottom portion configured to support a hip of the passenger. The vehicle passenger seat assembly further includes a first horizontal beam that connects the pair of side frames and is disposed at the same vertical height, from a floor of the passenger cabin, as a lower end of the back portion.

One or more embodiments of the present invention are directed to a vehicle passenger seat assembly including: a structural frame that includes a pair of side frames, a frame of a back support of a passenger seat, a first horizontal beam that connects the pair of side frames at a lower end of the back support, a second horizontal beam that connects the pair of side frames at top forward corners of the pair of side frames, and a third horizontal beam that connects the pair of side frames at bottom forward corners of the pair of side frames; a first stretchable fabric that extends across the frame of the back support and supports a back of a seated passenger; a second stretchable fabric that extends between the first horizontal beam and the second horizontal beam and supports a hip of the seated passenger; a third stretchable fabric that extends between the second horizontal beam and the third horizontal beam; a first cushion on the first stretchable fabric; a second cushion on the second stretchable fabric; and a third cushion on the third stretchable fabric.

DETAILED DESCRIPTION

Figure 1:
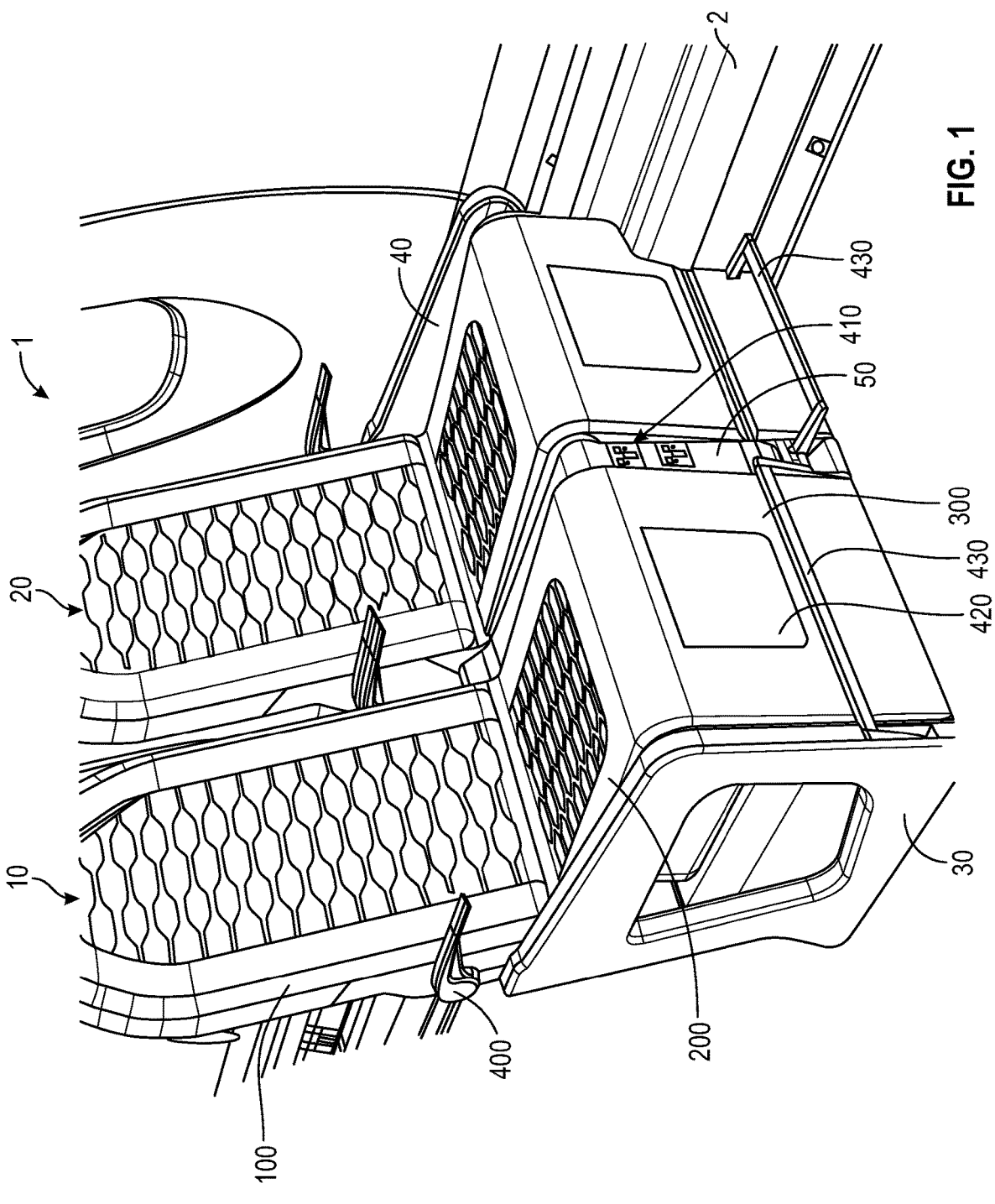
FIG. 1 shows a front-side perspective view of a passenger seat assembly according to one or more embodiments.

Specific embodiments of the invention will now be described in detail with reference to the accompanying figures. Like elements in the various figures are denoted by like reference numerals for consistency. The embodiments described herein are directed to passenger seat assemblies for an aircraft for illustration purposes only. One of ordinary skill in the art would appreciate that the same or similar concepts described herein may be utilized in cabins of other passenger vehicles (e.g., trains, buses, etc.).

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 2:
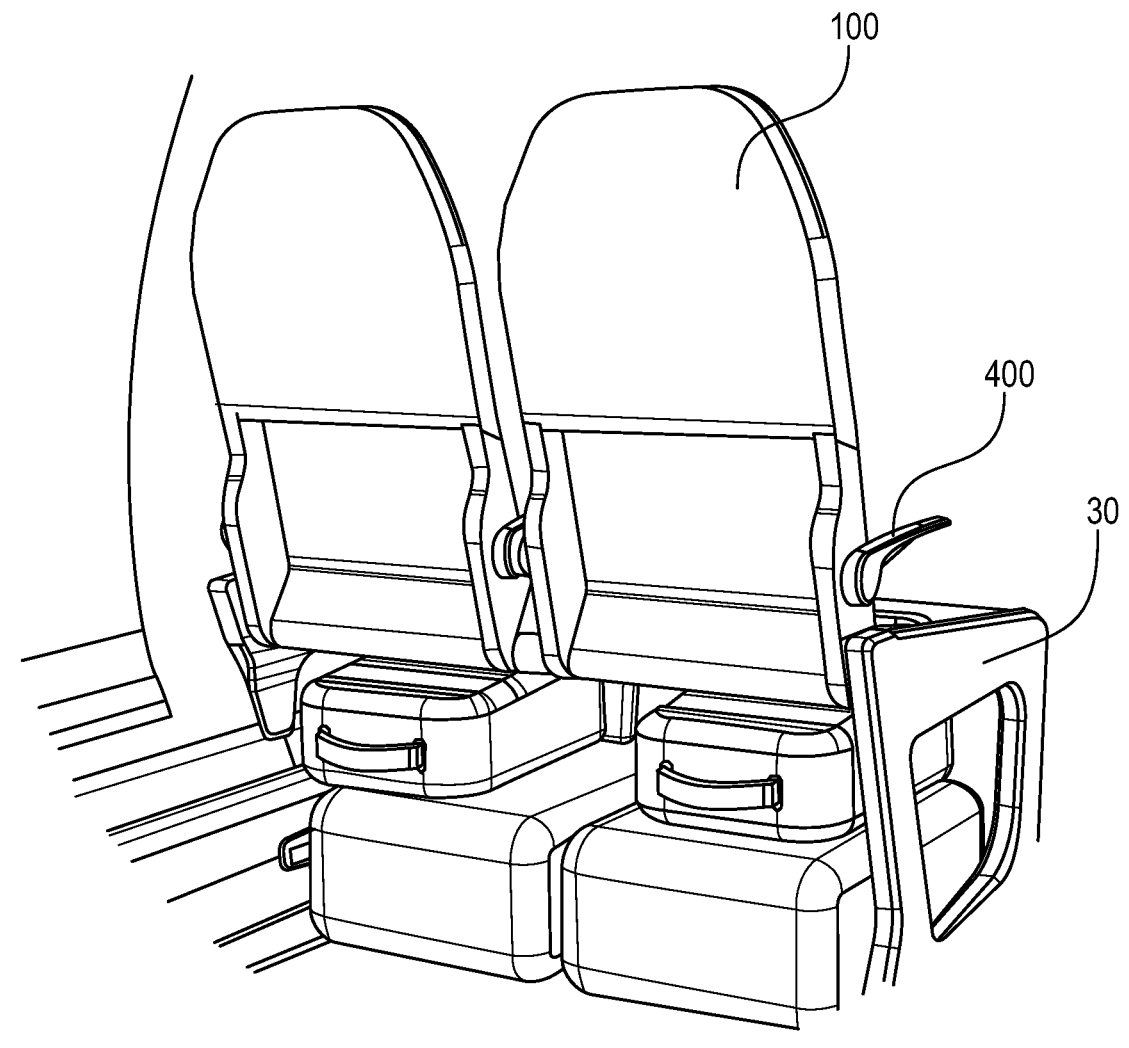
FIG. 2 shows a rear-side perspective view of a passenger seat assembly according to one or more embodiments.

FIGS. 1 and 2 show front-side and rear-side perspective views of a passenger seat assembly 1 according to one or more embodiments, respectively. The passenger seat assembly 1 comprises two passenger seats 10, 20 for two passengers. The passenger seats 10, 20 are configured such that the seated passengers face forward in a direction of aircraft. The passenger seat 20 has a similar construction to the passenger seat 10 unless described otherwise hereafter.

Although the passenger seat assembly 1 shown in FIGS. 1 and 2 comprises two passenger seats 10, 20 for two passengers in a single row, the passenger seat assembly 1 may include three or more passenger seats that are the same or substantially similar construction as the passenger seats 10, 20.

As shown, the passenger seat 10 comprises a back portion 100, a bottom portion 200, and a leg portion 300. When the passenger seat 10 is installed in an aircraft cabin, the bottom portion 200 extends in a substantially horizontal direction whereas the back portion 100 and the leg portion 300 extend in substantially vertical directions. As seen in FIG. 1, the bottom portion 200 is disposed between the lower end of the back portion 100 and the top end of the leg portion 300. The leg portion 300 extends toward the floor of the aircraft cabin. The passenger seat assembly 1 also comprises two side frames 30, 40. In one or more embodiments, the side frame 30 is fixed to a floor of the aircraft cabin whereas the side frame 40 is fixed to seat-track 2 that is installed on a side of the aircraft cabin. Further, in one or more embodiments, the side frame 40 may be fixed to the floor in a similar manner like the side frame 30.

Space underneath the passenger seats 10, 20 and between the side frames 30, 40 may be used to stow luggage such as suitcases as shown in FIG. 2. The space can also be used to stow clothing and other personal items such as shopping bags and portable computers.

A spacer assembly 50 (i.e., spacer) may be disposed between the passenger seats 10, 20. In the spacer assembly 50, an in-seat power supply (ISPS) outlet 410 may be disposed on a surface facing forward when the passenger seat assembly 1 is installed in the aircraft cabin. Although FIG. 1 shows two ISPS outlets 410 between the passenger seats 10, 20, more than two ISPS outlets may be equipped in the spacer assembly 50. The spacer assembly 50 may vary in width to accommodate more items such as ISPS outlets or other hardware. Further, multiple spacer assemblies 50 may be disposed between the passenger seats 10, 20. The top of the spacer assembly 50 may be covered by seat material (i.e., spacer cover) and raised to the height of the bottom portion 200. In other words, the seat material (i.e., spacer cover) may be placed over the spacer assembly up to the height of the bottom portion 200. In other embodiments, the spacer assembly 50 may extend to the height of the bottom portion 200. In any of the above constructions, a smooth continuous surface can be provided at the same height as the bottom portion 200.

The leg portion 300 of the passenger seat 10 comprises a life vest pouch access 420 (to be described further below). The leg portion 300 of the window-side passenger seat 20 may have a different shape from the leg portion 300 of the aisle-side passenger seat 10 to accommodate equipment installed on the side wall of the aircraft cabin. For example, as shown in FIG. 1, the leg portion 300 of the window-side passenger seat 20 may have a notch to accommodate the seat-track 2.

A pair of armrests 400 are attached to the passenger seat 10 at both sides on the passenger seat 10. Each armrest 400 may be attached to the back portion 100 of the passenger seat 10 with a hinge around which the armrest 400 may rotate. With this construction, the armrest 400 aligns with (i.e., become parallel to) the back portion 200 when it is not used and is lowered as shown in FIG. 1 to hold an elbow (as an "elbow-rest") and/or any part of a forearm of a passenger seated in the passenger seat 10.

Compared to an armrest of conventional aircraft seats, the armrest 400 is narrower in width and protrudes less from the back portion 100 of the passenger seat 10 in a sideway direction (or in a direction of the rotational axis of the hinge), which allows the width of the back portion 100 of the passenger seat 10 to be increased.

Further, as shown in FIG. 1, the passenger seat 10 is equipped with a footrest 430. A hinge mechanism is used to attach the footrest 430 to at least one of the side frames 30, 40 and the spacer assembly 50. With this construction, the footrest 430 can be folded to be stored in the leg portion 300 of the passenger seat 10 when the aircraft takes off or lands. The footrest 430 can be used, for example, to accommodate shorter passengers whose feet may not reach the floor while seated.

Figure 3:
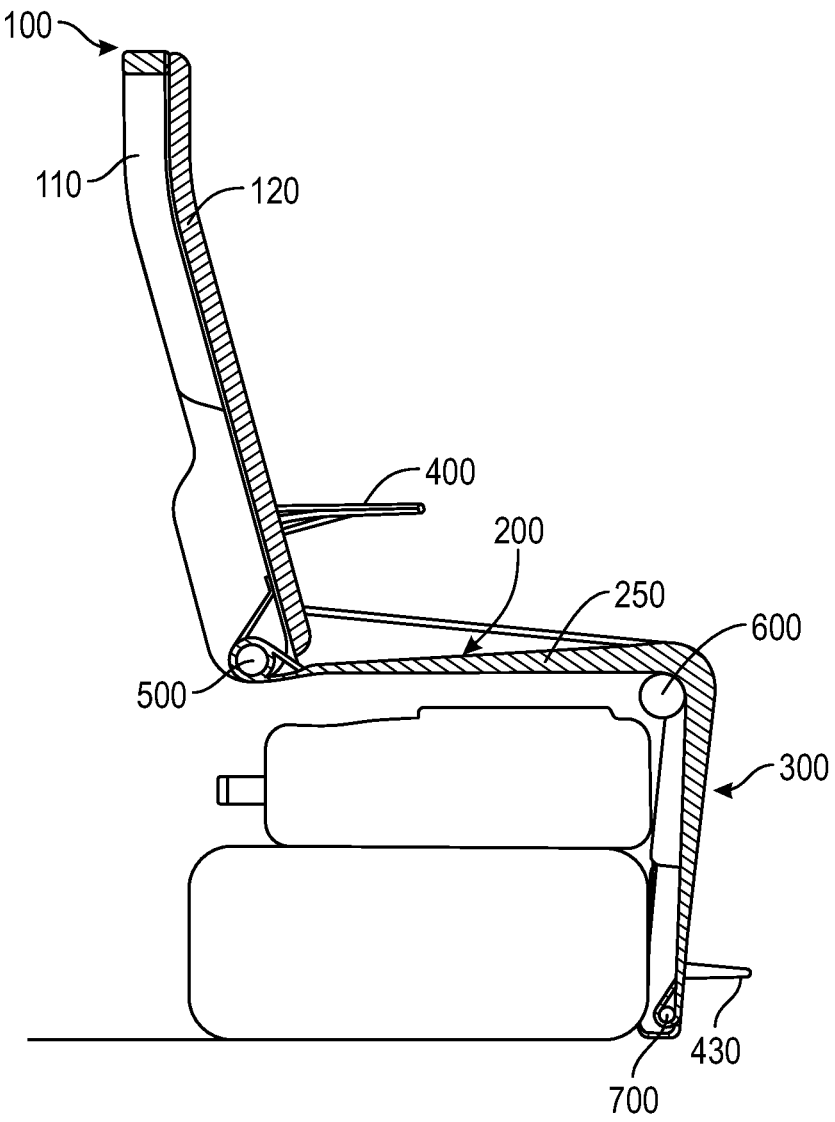
FIG. 3 shows a cross section of a passenger seat assembly according to one or more embodiments.

FIG. 3 shows a cross section of the passenger seat assembly 1. The back portion 100 of the passenger seat 10 comprises a back support 110 and a back cushion 120 on the front surface of the back support 110 when the passenger seat assembly 1 is installed in the aircraft cabin. In one or more embodiments, the bottom portion 200 and the leg portion 300 of the passenger seat 10 are integrally formed with a seat cover 250. The seat cover 250 may be made of a stretchable fabric such as canvas and tensioned between first horizontal beam 500 and third horizontal beam 700. Second horizontal beam 600 is disposed on the back side of the seat cover 250 where the bottom portion 200 and the leg portion 300 meet. One end of the seat cover 250 comprises a fastener such as buttons or hook-and-loop fasteners (Velcro®) such that the end may be looped around the first horizontal beam 500 and fixed to the seat cover 250. Similarly, another end of the seat cover 250 comprises another fastener such that the end may be looped around the third horizontal beam 700 and fixed to the seat cover 250.

As shown in FIG. 3, the bottom portion 200 of the passenger seat 10 is raised such that more space is made available underneath the passenger seat 10. In one or more embodiments, the underneath space can accommodate a carry-on suitcase (which may have a dimension of 15.5 inches in width, 21.5 inches in length, and 9 inches in depth) and still have room to accommodate additional items such as bags and clothing. Furthermore, the first horizontal beam 500 is disposed at a height slightly above the bottom portion 200 of the passenger seat 10 and located behind the top of the seat-bottom, which makes stowing of luggage easier than in conventional aircraft as described further below.

More specifically, in one or more embodiments, the first horizontal beam 500 is disposed at the lower end of the back portion 100 (at the same height from the floor as the lower end of the back portion 100). Further, in one or more embodiments, the first horizontal beam 500 is disposed higher than the second horizontal beam 600. This construction eases access of the space underneath the passenger seats 10, 20 via an opening below the first horizontal beam 500, as discussed further below.

As shown in FIG. 3, the seat cover 250 may be looped around the first horizontal beam 500 and fixed such that the highest point of the top surface of the bottom portion 200 is at the same height or lower than the highest point of the first horizontal beam 500. This construction limits the height of the bottom portion 200 from the floor even when the first horizontal beam 500 is placed at a certain height and suppresses increase in the overall height of the passenger seat assembly 1.

The extra space underneath the passenger seats 10, 20 can also accommodate legs and feet of the passengers. Passengers may stretch their legs and feet into the space with or without luggage. The extra space provides enhanced comfort for the passengers.

In order to create more space underneath the passenger seat 10, the bottom portion 200 of the passenger seat 10 is positioned higher than a conventional passenger seat as described further below. The height of the footrest 430 is configured to comfortably support the feet of a passenger whose feet would otherwise dangle above the floor, which may cause discomfort.

Material of the seat cover 250 is selected and/or the tension of the seat cover 250 is adjusted such that a passenger seated in the passenger seat 10 may sit as comfortably as in a conventional seat with a polyurethane seat cushion or better, even if the seat cover 250 is thinner than the polyurethane seat cushion of conventional seats. The sag of the stretchable material will be controlled and limited to a predetermined amount by choice of material, by adjusted tension, or with other structural features to ensure that stowed luggage is not compressed or crushed.

Similarly, material of the back cushion 120 is selected such that the back cushion 120 is thinner than a polyurethane back cushion of the conventional seat. Such thin design of the back cushion 120 yields more room for a passenger in the passenger seat 10 between the back cushion 120 and the back support 110 of another passenger seat of a next row located in a forward direction of the aircraft.

As shown in FIG. 3, the length of the armrest 400 is less than half of the depth dimension of the bottom portion 200 (dimension in the forward-aft direction of the aircraft). With this construction, even when the armrest 400 is lowered as shown in FIGS. 1 and 3, the armrest 400 would not interfere with passengers boarding/deboarding the aircraft or stowing luggage under the passenger seat 10 of the next row in front.

A top edge of the side frame 30, which is opposite to the edge of the side frame 30 attached to the floor of the aircraft cabin, is positioned higher than the bottom portion 200 of the passenger seat 10 as shown in FIGS. 1 and 3. With this construction, a passenger seated in the passenger seat 10 will not slide off from the bottom portion 200 when a force acts sideway on the passenger. The height of the side frame 30 is determined to satisfy necessary certifications for aircraft safety and/or to achieve a safe retention of the passenger during a high impact test. The side frame 40 may also have a similar construction. Similarly, the spacer assembly 50 may protrude above the height of the bottom portion 200 of the passenger seat 10.

Figure 4:
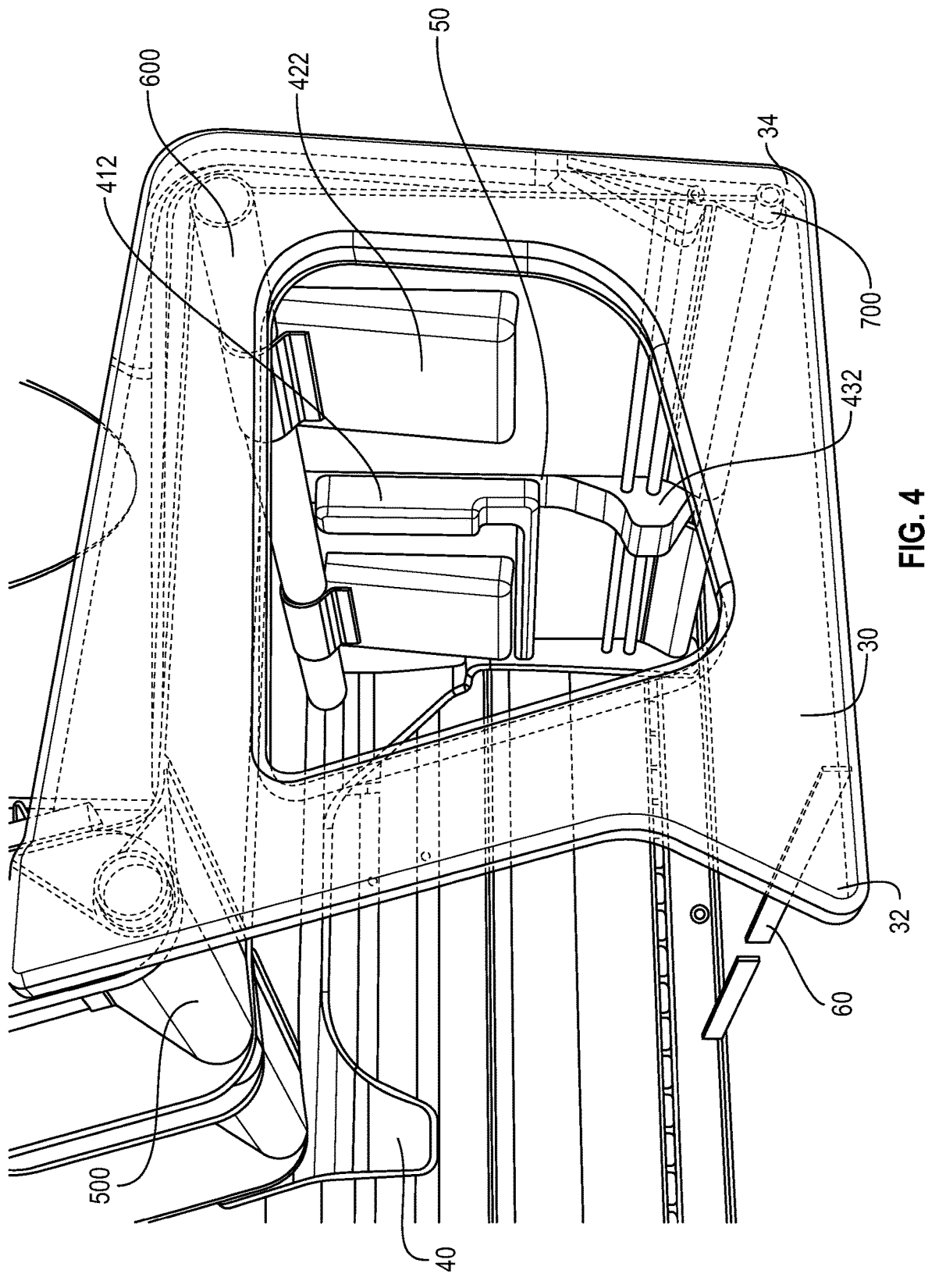
FIG. 4 shows a view underneath a passenger seat assembly according to one or more embodiments.

FIG. 4 shows a view underneath the passenger seat assembly 1. The side frame 30 shown in FIG. 4 has a substantially square shape and has an opening around the center of the side frame 30. The first, second, and third horizontal beams 500, 600, 700 are rigidly attached to the side frame 30 and the mating side frame 40. With this construction, the side frames 30, 40 together with the horizontal beams 500, 600, 700 are rigid enough to support the weight of the passenger seat assembly 1 and the weight of passengers with sufficient safety margins required by relevant regulations. Also, because the side frame 30 has a relatively large opening at the center, space underneath the passenger seats 10, 20 can be easily accessed and any items dropped in this space can be easily picked up. The side frame 30 may have different shapes as long as it is structurally rigid and can provide an access to the space underneath the passenger seat 10 for picking up items dropped in the space.

As shown in FIG. 4, the spacer assembly 50 does not protrude into the space underneath the passenger seats 10, 20.

In the example shown in FIG. 4, a life vest pouch 422 hangs down from the second horizontal beam 600. The passenger in the passenger seat 10 can access a life vest stored in the life vest pouch 422 through life vest pouch access 420 that is disposed on the seat cover 250 in the leg portion 300 as shown in FIG. 1. The life vest pouch 422 is situated such that the life vest pouch 422 does not protrude beyond the seat cover 250 in the forward-aft direction.

Similarly, an ISPS harness cover 412 disposed on the spacer assembly 50 is shaped such that the ISPS harness cover 412 does not protrude beyond the spacer assembly 50 in the forward-aft direction. On the back side of the spacer assembly 50, mechanism 432 such as a hinge for folding the footrest 430 is disposed.

As shown in FIG. 4, a rib 60 is disposed on the floor of the passenger cabin near back end corner 32 of the side frame 30 to prevent the luggage stowed underneath the passenger seats 10, 20 from sliding out from the space underneath the passenger seats 10, 20. The rib 60 may be integral with the side frame 30. The rib 60 may also be integral with the side frame 40 when the side frame 40 extends down to the floor of the passenger cabin. Alternatively, the rib 60 may be fixed on the floor of the passenger cabin separately from the side frame 30. Further, although two ribs 60 are shown in FIG. 4, a single rib 60 may extend under both the passenger seats 10, 20 for the entire width of the passenger seat assembly 1.

Figure 5:
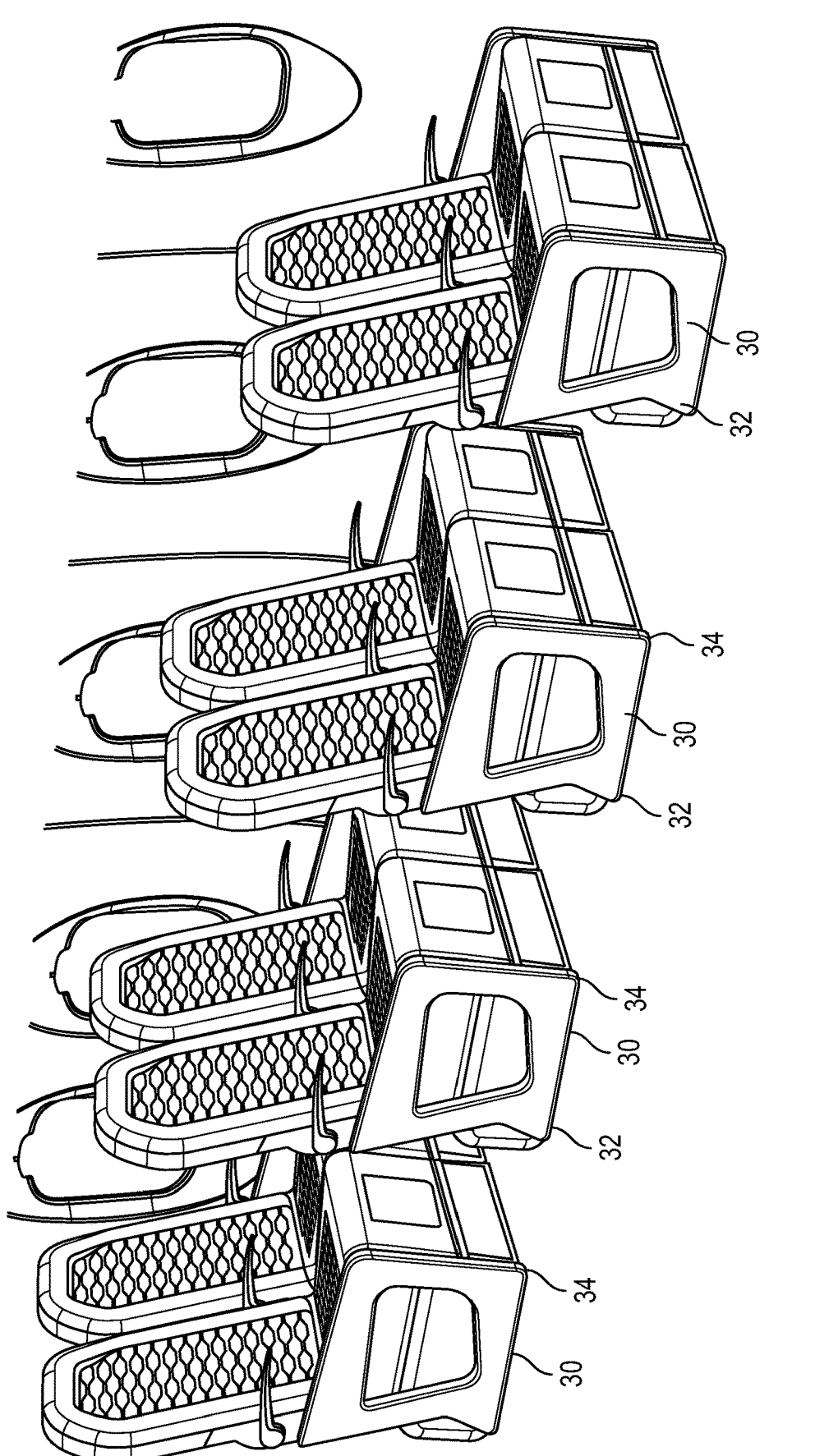
FIG. 5 shows a perspective view of a sample aircraft cabin that accommodates a plurality of passenger seat assemblies according to one or more embodiments.

FIG. 5 shows a perspective view of a sample aircraft cabin that accommodates a plurality of the passenger seat assemblies 1 in rows according to one or more embodiments. Pitches of the passenger seat assemblies 1 may be varied so that a distance between front end corner 34 of the side frame 30 of the passenger seat assembly 1 and the back end corner 32 of the side frame 30 of the passenger seat assembly 1 of a next front row can vary. For example, the distance shown in FIG. 5 varies between 37 inches and 40 inches. A shorter distance provides more room for a passenger with a window seat to move into and out even while another passenger with an adjacent seat remains seated. The distance between the front end corner 34 of the side frame 30 and the back end corner 32 of the side frame 30 of a next front row may be reduced further to 31 inches for high density configurations where the size of carry-on luggage can be limited to smaller and/or where less expectation of passenger comfort is needed.

Figure 6:
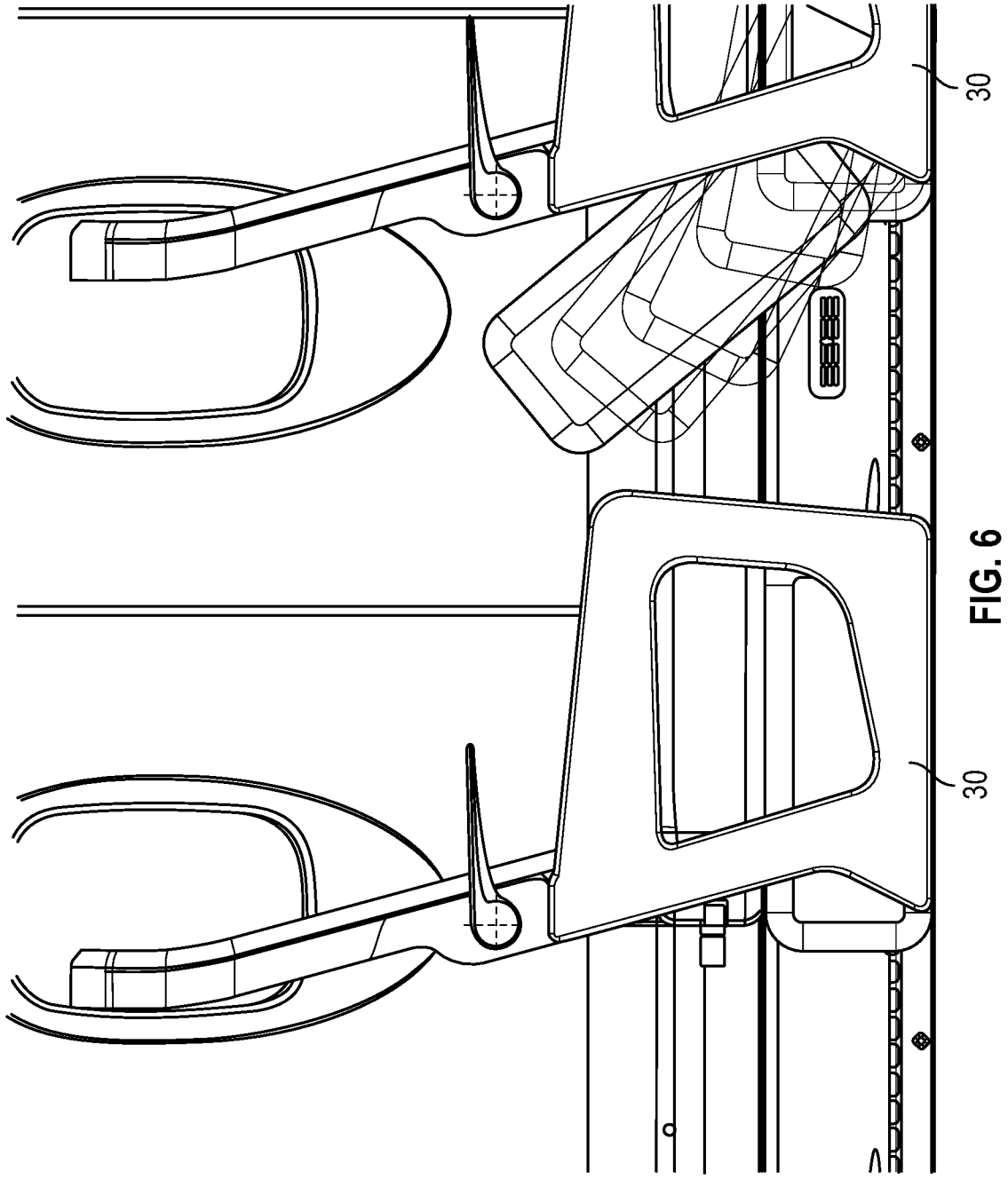
FIG. 6 shows movement of luggage when the luggage is placed in or removed from space underneath a passenger seat assembly according to one or more embodiments.

Because the first horizontal beam 500 is fixed at a height and space underneath the passenger seat 10 has a large opening toward the aft of the aircraft, luggage stowed in the space can be easily placed in and removed from the space even when the distance between two rows of the passenger seat assemblies 1 is small. FIG. 6 shows movement of luggage when the luggage is placed in or removed from the space underneath the passenger seat 10. This feature enables not only easy stowing of the luggage but also access to the luggage during flight even when a passenger remains seated due to flight conditions of the aircraft and the overhead bin cannot open in a conventional aircraft.

Figure 7:
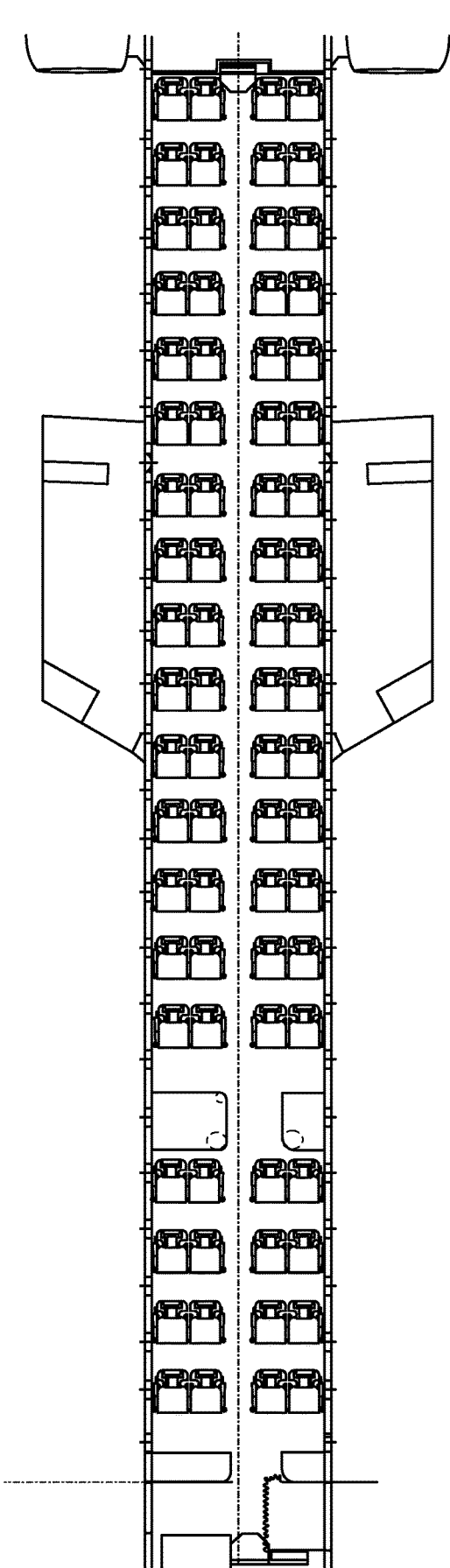
FIG. 7 shows a sample of layout of passenger accommodation (LOPA) in sample aircraft.

FIG. 7 shows a sample of layout of passenger accommodation (LOPA) in sample aircraft with the passenger seat assemblies 1 according to one or more embodiments. As shown in FIG. 7, the sample aircraft accommodates 19 rows of passenger seats for 38 seat assemblies (i.e., 76 seats in total). The seat configuration is substantially the same as that with conventional passenger seat assemblies. The passenger seat assemblies 1 according to one or more embodiments can fit into a fuselage of typical aircraft to replace conventional passenger seat assemblies.

Figure 8:
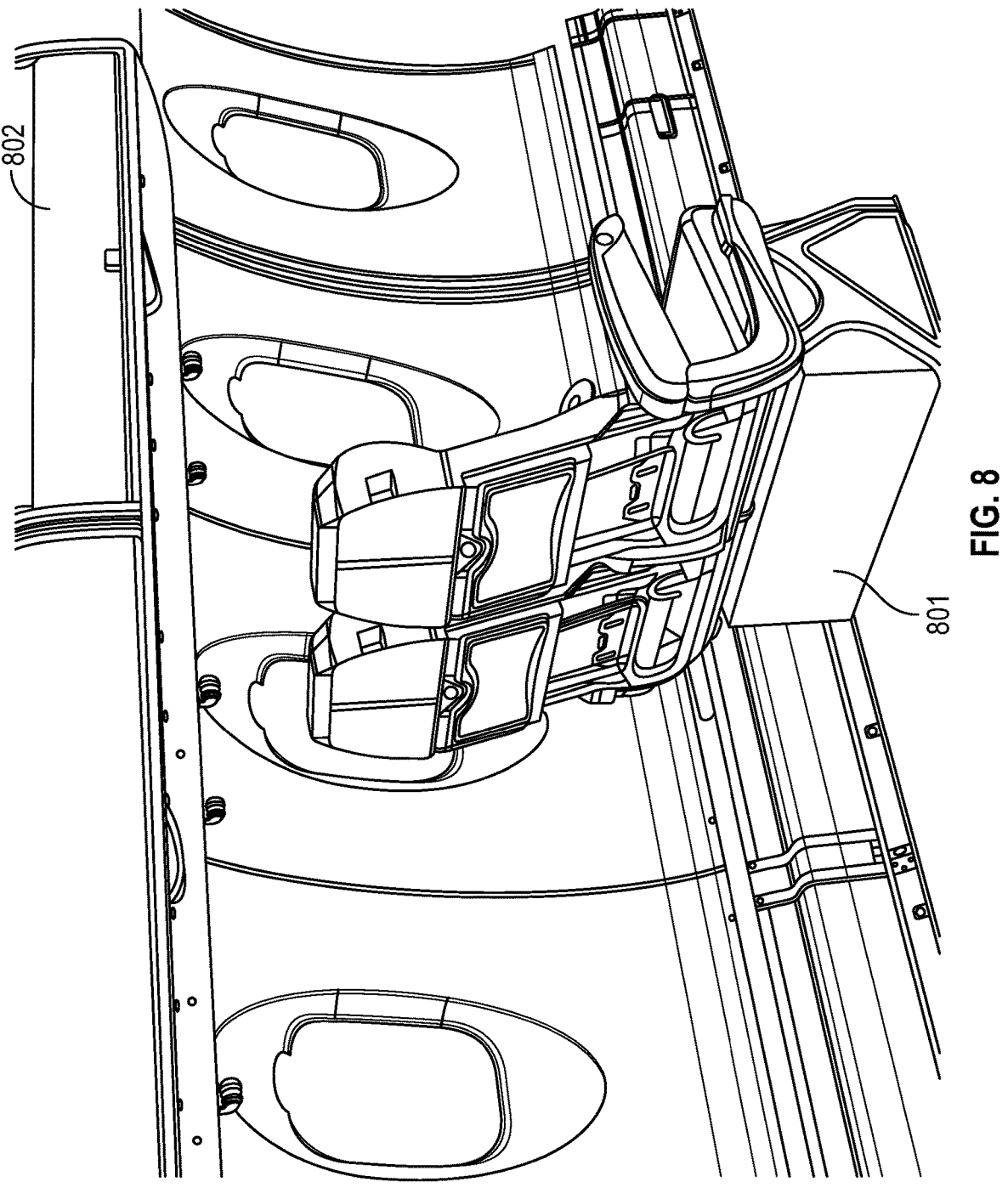
FIG. 8 shows a perspective view of a conventional industry-standard passenger seat assembly installed in an aircraft cabin.

FIG. 8 shows a perspective view of a row of conventional passenger seats installed in an aircraft cabin. In typical aircraft, luggage can be stowed underneath the seats in front and in the overhead bin, as shown in FIG. 8. Luggage space 801 underneath the two seats in the design shown in FIG. 8 is 5,150 in$^3$. Overhead bins 802 have a volume of 185 in$^3$ per inch of the forward-aft length of the overhead bins 802. In the sample LOPA shown in FIG. 7, which contains 19 rows of passenger seats both portside and starboard and a total of 38 seat assemblies, the total volume of 475,003 in$^3$ would be available for stowing luggage.

Figure 9:
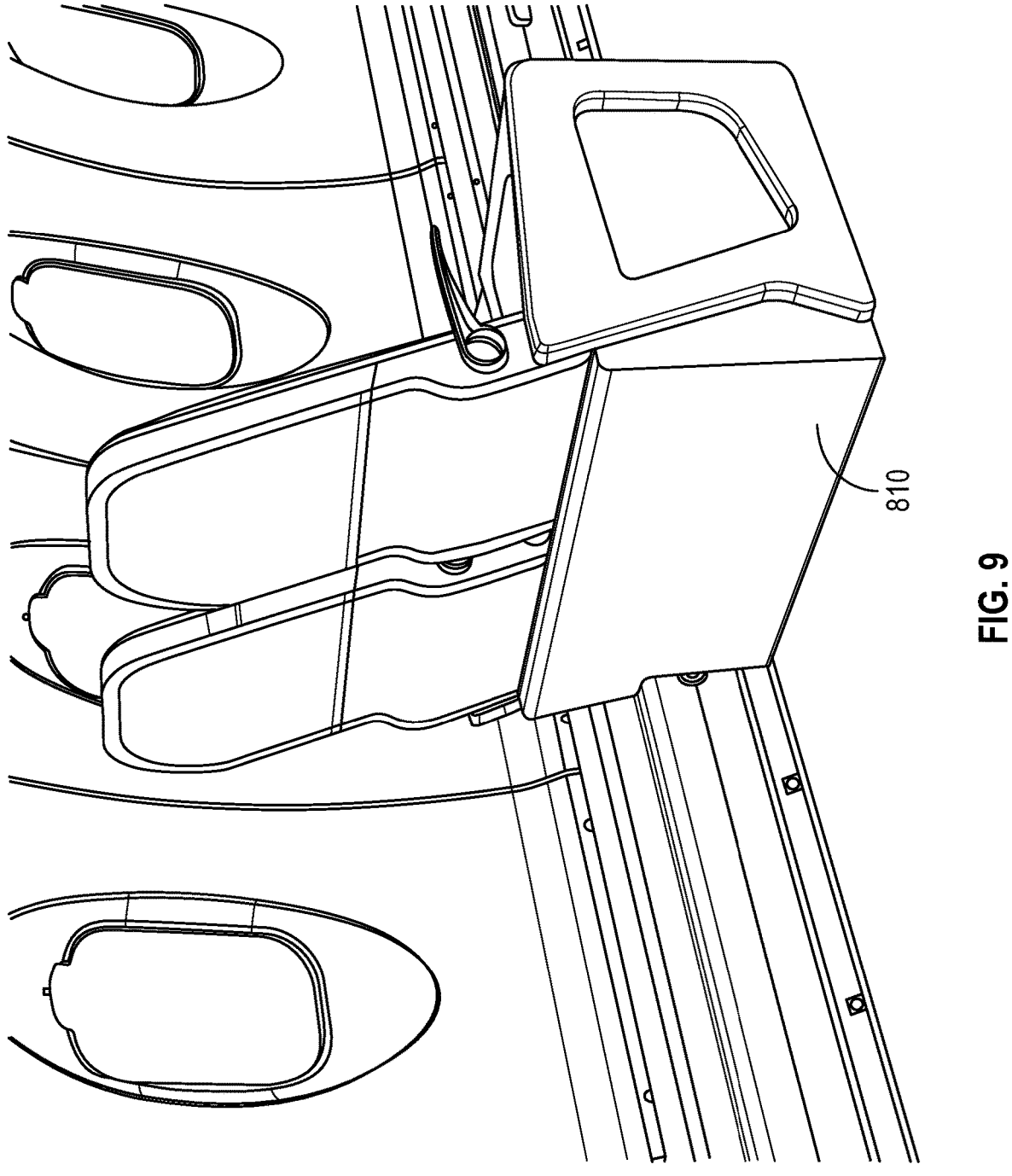
FIG. 9 shows a perspective view of a passenger seat assembly according to one or more embodiments.

FIG. 9 shows a perspective view of a row of passenger seat assembly 1 installed in an aircraft cabin. In one or more embodiments, luggage space 810 underneath the two seats has a volume of 12,890 in$^3$. Because the passenger seat assembly 1 may be taller than the conventional seats shown in FIG. 8, aircraft may not accommodate overhead bins. Nevertheless, in the same sample LOPA shown in FIG. 7, the total volume of luggage space is calculated as 490,900 in$^3$, which is larger than the volume available in conventional seat designs. The luggage space for each passenger is in a single compartment (i.e., underneath the seat in front), which yields flexibility in use of the space and/or enable quicker stowage of luggage. Furthermore, the overhead bin is no longer needed to secure the luggage space in the aircraft cabin. Consequently, the number of parts for dressing up the aircraft is reduced and the weight associated with the overhead bin may be saved in the aircraft with the passenger seat assembly 1.

Figure 10:
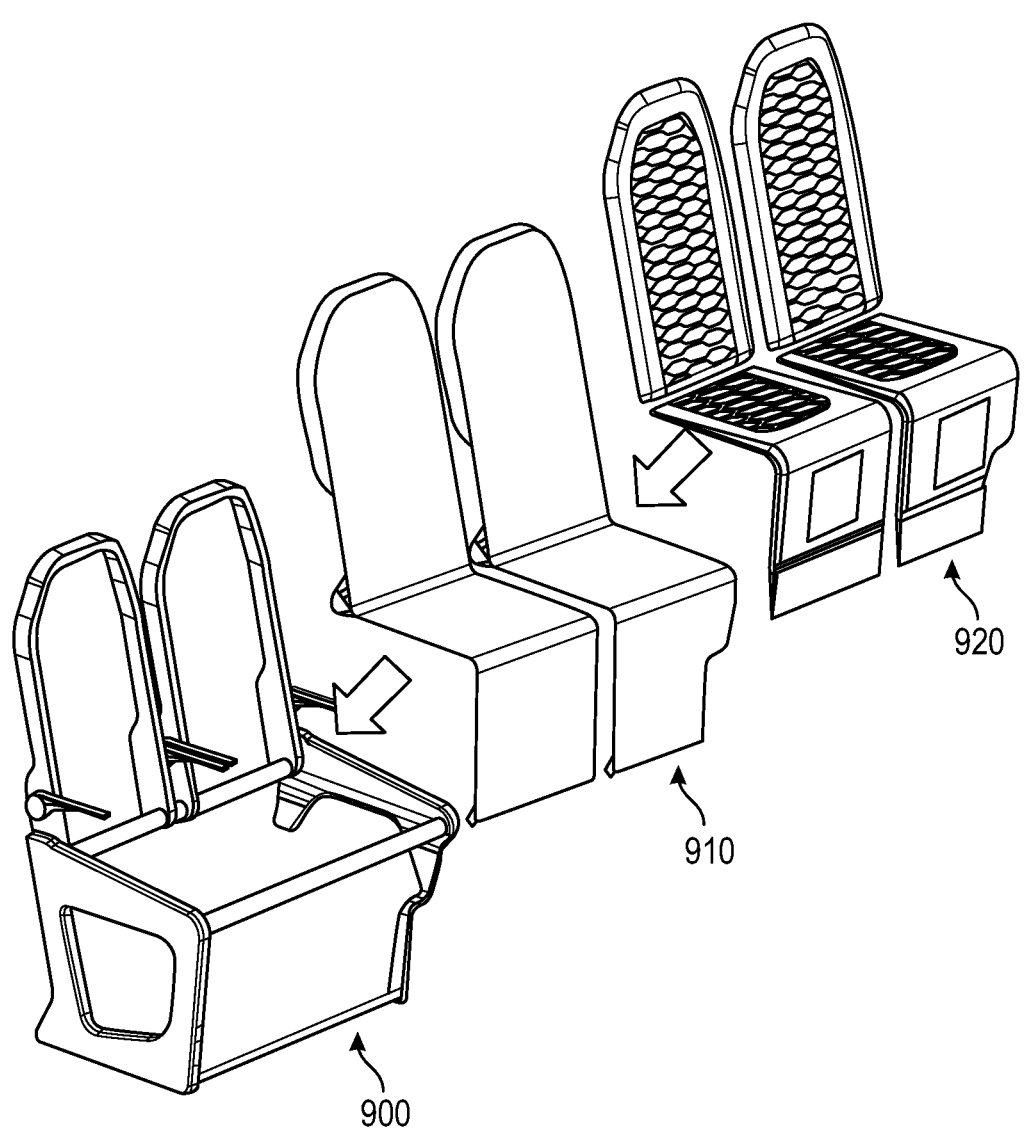
FIG. 10 shows an exploded view of a construction of a passenger seat assembly according to one or more embodiments.

FIG. 10 shows an exploded view of a construction of a passenger seat assembly according to one or more embodiments. In this construction, a passenger seat assembly comprises a frame structure 900, a stretchable fabric 910, and a seat cushion 920. The seat cushion 920 is integrated together with the stretchable fabric 910 on the surface of the stretchable fabric 910, as explained in other embodiments with the seat cover 250 above. The stretchable fabric 910 provides seating comfort. Therefore, the seat cushion 920 is thinner to provide a similar level of seating comfort compared to a conventional passenger seat assembly. Although FIG. 10 shows a construction in which the first horizontal beam 500 is shared by the passenger seats 10, 20, the first horizontal beam 500 may be divided for each of the passenger seats 10, 20.

In embodiments shown in FIG. 10, the stretchable fabric 910 can be a structural component of the passenger seat assembly that supports the passengers. Then, the frame structure 900 and the stretchable fabric 910 can replace a structural construction (aluminum seat pan) of a conventional passenger seat assembly. This construction of the passenger seat assembly allows the first horizontal beam 500 to be placed at a different location that increases the clearance for access to the space underneath the passenger seat assembly 1 and increases the volume of the space.

Figure 11:
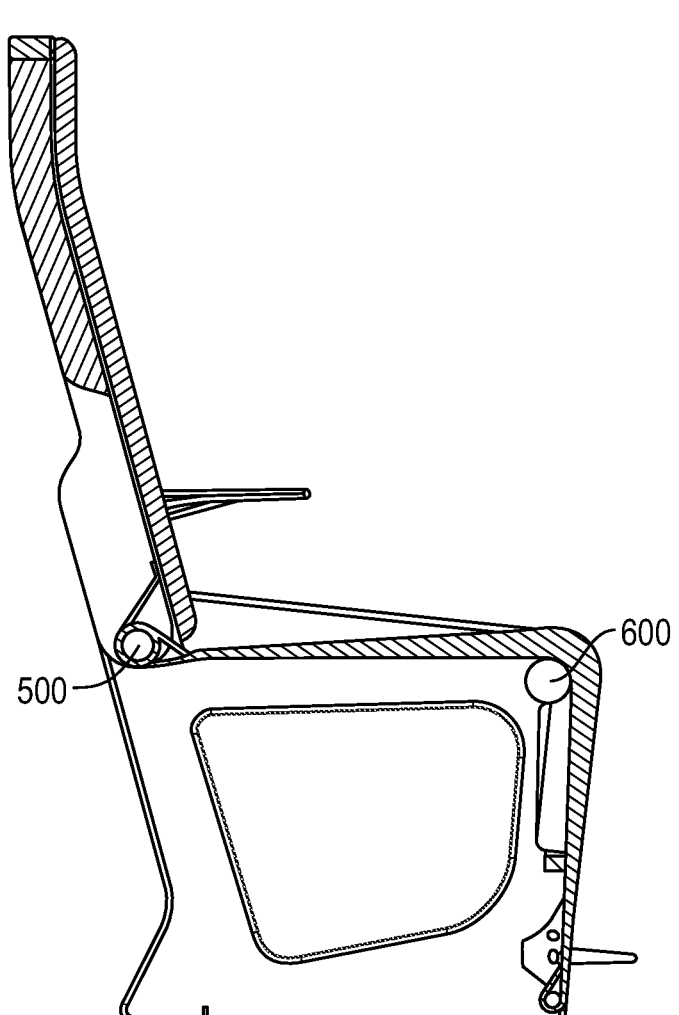
FIG. 11 shows a structure of a passenger seat assembly according to one or more embodiments.
Figure 12:
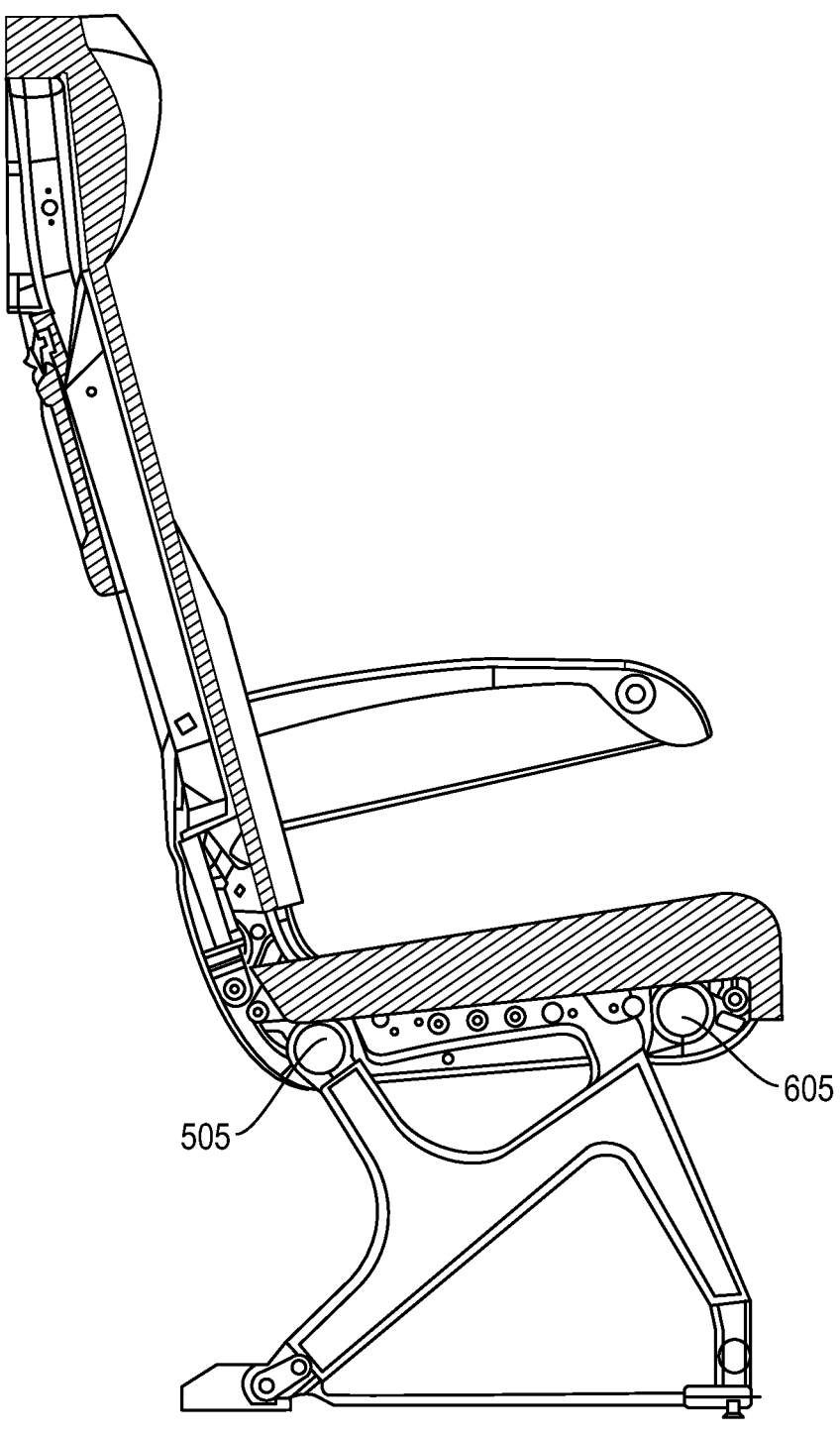
FIG. 12 shows a structure of a conventional industry-standard passenger seat assembly.

FIG. 11 shows a structure of the passenger seat assembly 1 according to one or more embodiments whereas FIG. 12 shows a structure of a conventional industry-standard passenger seat assembly. The passenger seat assemblies shown in FIGS. 11 and 12 have a substantially similar height. However, as shown in FIG. 11, the first and second horizontal beams 500, 600 are at positions higher than the horizontal beams 505, 605 from the bottoms of passenger seat assemblies or the floor of the aircraft cabin.

As described above, the passenger seat assembly 1 according to one or more embodiments of the present invention comprises a pair of side frames, horizontal beams that connect the side frames, and stretchable fabric that directly supports the backs and hips of the passengers. The design of the pair of side frames and the horizontal beams provides a similar structural integrity of the passenger seats as a conventional industry-standard passenger seat assembly. However, by providing the horizontal beams at positions higher than those of a conventional industry-standard passenger seat, the space underneath the passenger seat assembly can be increased and better access to the space can be achieved without compensating the structural integrity. Further, by properly designing the side frames, horizontal beams, and stretchable fabric, the passenger seat assembly 1 according to one or more embodiments of the present invention can comply with strict safety regulations while the space underneath the passenger seat assembly is secured as discussed above.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A vehicle passenger seat assembly for a passenger cabin of a vehicle, comprising:
    a pair of side frames;
    passenger seats disposed between the pair of side frames, wherein each of the passenger seats comprises:
        a back portion configured to support a back of a passenger; and
        a bottom portion configured to support a hip of the passenger; and
    a first horizontal beam that connects the pair of side frames and is disposed at a same vertical height, from a floor of the passenger cabin, as a lower end of the back portion, wherein
    the bottom portion is integrally formed with a seat cover, and
    the seat cover is looped around the first horizontal beam and fixed such that the bottom portion is disposed at a vertical height that is at or below a highest point of the first horizontal beam.

2. The vehicle passenger seat assembly according to claim 1, wherein one of the pair of side frames protrudes higher than the bottom portion.

3. The vehicle passenger seat assembly according to claim 1, further comprising:
    an armrest disposed on a side of the back portion of each of the passenger seats via a hinge, wherein
    the armrest is rotatable around the hinge to become parallel to the back portion,
    a length of the armrest is less than half a length of the bottom portion in a forward-aft direction of the vehicle.

4. The vehicle passenger seat assembly according to claim 1, further comprising:
    a spacer disposed between two adjacent ones of the passenger seats and that comprises a power outlet.

5. The vehicle passenger seat assembly according to claim 4, wherein the spacer protrudes higher than a top surface of the bottom portion.

6. The vehicle passenger seat assembly according to claim 4, further comprising:
    a spacer cover that is disposed over the spacer, wherein
    a top of the spacer is lower than a top surface of the bottom portion, and
    a top of the spacer cover is at a same height as the bottom portion.

7. The vehicle passenger seat assembly according to claim 4, further comprising:
    a footrest that is attached to the spacer via a footrest hinge.

8. The vehicle passenger seat assembly according to claim 4, wherein the spacer does not protrude into a space between the two adjacent ones of the passenger seats.

9. The vehicle passenger seat assembly according to claim 1, further comprising:
    a footrest that is attached to one of the pair of side frames via a footrest hinge.

10. The vehicle passenger seat assembly according to claim 1, wherein
    the first horizontal beam is disposed at a lower end of the back portion,
    the vehicle passenger seat assembly further comprises:
        a second horizontal beam that connects the pair of side frames and that is disposed at a forward edge of the bottom portion;

a leg portion that extends from the second horizontal beam toward the floor; and a third horizontal beam that is attached to at least one of the pair of side frames and that is disposed at a lower edge of the leg portion;

the back portion comprises a first stretchable fabric for supporting the back of the passenger, the bottom portion comprises a second stretchable fabric for supporting the hip of the passenger, the leg portion comprises:

a third stretchable fabric that is integrated with the second stretchable fabric; and a third cushion, and the third stretchable fabric and the third cushion each have an opening for a pouch that accommodates a life vest.

11. The vehicle passenger seat assembly according to claim 1, wherein at least one of the pair of side frames has an opening at a center through which a space under the vehicle passenger seat assembly is accessible.

12. The vehicle passenger seat assembly according to claim 1, further comprising:

a rib on the floor of the passenger cabin at a rear end of one of the pair of side frames.

13. A vehicle passenger seat assembly comprising:

a structural frame that comprises:

a pair of side frames;

a frame of a back support of a passenger seat;

a first horizontal beam that connects the pair of side frames at a lower end of the back support;

a second horizontal beam that connects the pair of side frames at top forward corners of the pair of side frames; and a third horizontal beam that connects the pair of side frames at bottom forward corners of the pair of side frames;

a first stretchable fabric that:

extends across the frame of the back support; and supports a back of a seated passenger;

a second stretchable fabric that:

extends between the first horizontal beam and the second horizontal beam; and supports a hip of the seated passenger;

a third stretchable fabric that extends between the second horizontal beam and the third horizontal beam;

a first cushion on the first stretchable fabric;

a second cushion on the second stretchable fabric; and a third cushion on the third stretchable fabric, wherein the second stretchable fabric is looped around the first horizontal beam and fixed such that the second cushion is disposed at a vertical height that is at or below a highest point of the first horizontal beam.

14. The vehicle passenger seat assembly according to claim 13, wherein the second stretchable fabric is integrated together with the third stretchable fabric.

15. The vehicle passenger seat assembly according to claim 13, further comprising:

a pouch that accommodates a life vest, wherein the third stretchable fabric and the third cushion each have an opening for the pouch, and the pouch hangs down from the second horizontal beam.

* * * * *